US010164706B2

United States Patent
Tang et al.

(10) Patent No.: US 10,164,706 B2
(45) Date of Patent: Dec. 25, 2018

(54) MULTI-IDENTITY OPTICS MODULES

(71) Applicant: Cisco Technology, Inc., San Jose, CA (US)

(72) Inventors: Norman Tang, Los Altos, CA (US); Liang Ping Peng, Santa Clara, CA (US); David Lai, Mountain View, CA (US); Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/499,196

(22) Filed: Apr. 27, 2017

(65) Prior Publication Data

US 2018/0241467 A1    Aug. 23, 2018

Related U.S. Application Data

(60) Provisional application No. 62/462,646, filed on Feb. 23, 2017.

(51) Int. Cl.
    *H04B 10/077*    (2013.01)
(52) U.S. Cl.
    CPC .............. *H04B 10/0775* (2013.01)
(58) Field of Classification Search
    CPC ................................. H04B 10/0775
    USPC ........................................... 398/9
    See application file for complete search history.

(56) References Cited

U.S. PATENT DOCUMENTS

| 6,862,322 B1 | 3/2005 | Ewen et al. | |
| 8,816,776 B2 | 8/2014 | Sindalovsky et al. | |
| 9,438,346 B2 | 9/2016 | Tang et al. | |
| 2005/0111845 A1 | 5/2005 | Nelson et al. | |
| 2005/0281193 A1* | 12/2005 | Hofmeister | H04L 1/205 370/217 |
| 2012/0011286 A1* | 1/2012 | Wong | H04B 10/40 710/14 |

FOREIGN PATENT DOCUMENTS

| WO | 2004/002023 A2 | 12/2003 |
| WO | 2011/002397 A1 | 1/2011 |

OTHER PUBLICATIONS

International Search Report and Written Opinion in corresponding International Application No. PCT/US2018/018879, dated Apr. 30, 2018, 9 pages.

(Continued)

*Primary Examiner* — Juan A Torres
(74) *Attorney, Agent, or Firm* — Edell, Shapiro & Finnan, LLC

(57) ABSTRACT

An optics module sends, to a host module, a pin signal indicating that an optics module is plugged into the host module, wherein the optics module is configured to operate at at least a first data rate and a second data rate. The optics module receives, from the host module, an indication of a host data rate. The optics module determines whether there is clock and data recovery loss of lock between the first data rate and a host data rate. If it is determined that there is clock and data recovery loss of lock between the first data rate and the host data rate, the optics module initializes at the second data rate if the second data rate matches the host data rate.

20 Claims, 11 Drawing Sheets

(56) References Cited

OTHER PUBLICATIONS

Bill Schweber, "Clock and Data Recovery: PLLs Clean, Re-clock Timing Signals in Wireless Links", https://www.digikey.com/en/articles/techzone/2016/jan/clock-and-data-recovery-plls-clean-re-clock-timing-signals-in-wireless-links, Jan. 26, 2016, 7 pages.
Jared Zerbe, "High-Speed Electrical Interfaces", EE290C—Spring 2004, Advanced Topics in Circuit Design, Lecture #15, CDR & Coding, Mar. 9, 2004, 17 pages.
"QSFP+ 10 Gbs 4x Pluggable Transceiver", Standardized as EIA-964 at Rev 4.8 dated Oct. 31, 2013, SFF-8436 Rev 4.8, 88 pages.
Specification, "Enhanced Small Form Factor Pluggable Module SFP+", SFF-8431, Revision 4.1, Jul. 6, 2009, 132 pages.
Specification, "Diagnostic Monitoring Interface for Optical Transceivers", Rev 12.2, Nov. 21, 2014, SFF-8472 Rev 12.2, 41 pages.
Specification, "Management Interface for Cabled Environments", Rev 2.6, Jun. 19, 2015, SFF-8636 Rev 2.6, 60 pages.

* cited by examiner

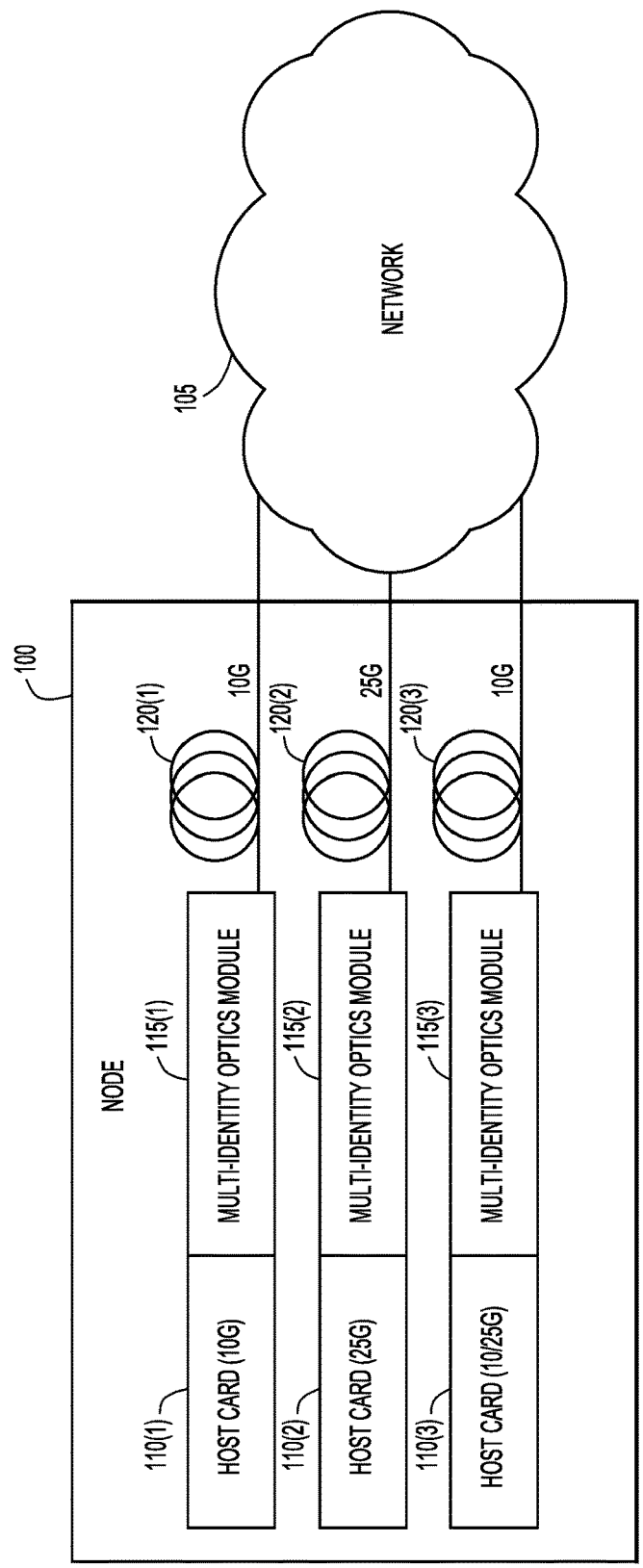

MULTI-IDENTITY OPTICS MODULES

CROSS REFERENCE TO RELATED APPLICATION

This application claims priority to U.S. Provisional Application No. 62/462,646 filed Feb. 23, 2017, the entirety of which is incorporated herein by reference.

TECHNICAL FIELD

The present disclosure relates to multi-identity multi-rate optics modules.

BACKGROUND

Optics modules are compact transceivers often used in data centers. Optics modules typically interface a host module (e.g., host card) with a fiber optic cable, and are generally designed to support one or more specific data rates (e.g., 1, 2.5, 10, 25, 50, etc. Gbit/s (G)) corresponding to a given platform. For example, single-rate 10 G optics modules are generally compatible with single-rate 10 G host modules. However, single-rate 10 G optics modules are not compatible with single-rate 25 G host modules, and single-rate 25 G optics modules are not compatible with single-rate 10 G host modules. Further, conventional multi-rate optics modules are only compatible with host modules having the host module software driver support for proper optics recognition. For example, dual-rate 10/25 G optics modules are generally compatible with dual-rate 10/25 G host modules but not with single-rate 25 G platforms because single-rate 25 G host modules lack the requisite host module software driver support. Thus, current multi-rate optics modules are not generally compatible with their corresponding single-rate host modules.

BRIEF DESCRIPTION OF THE DRAWINGS

FIG. 1 is a high-level block diagram of a node implementing multi-identity optics modules according to an example embodiment.

DESCRIPTION OF EXAMPLE EMBODIMENTS

Overview

Figure 2A:
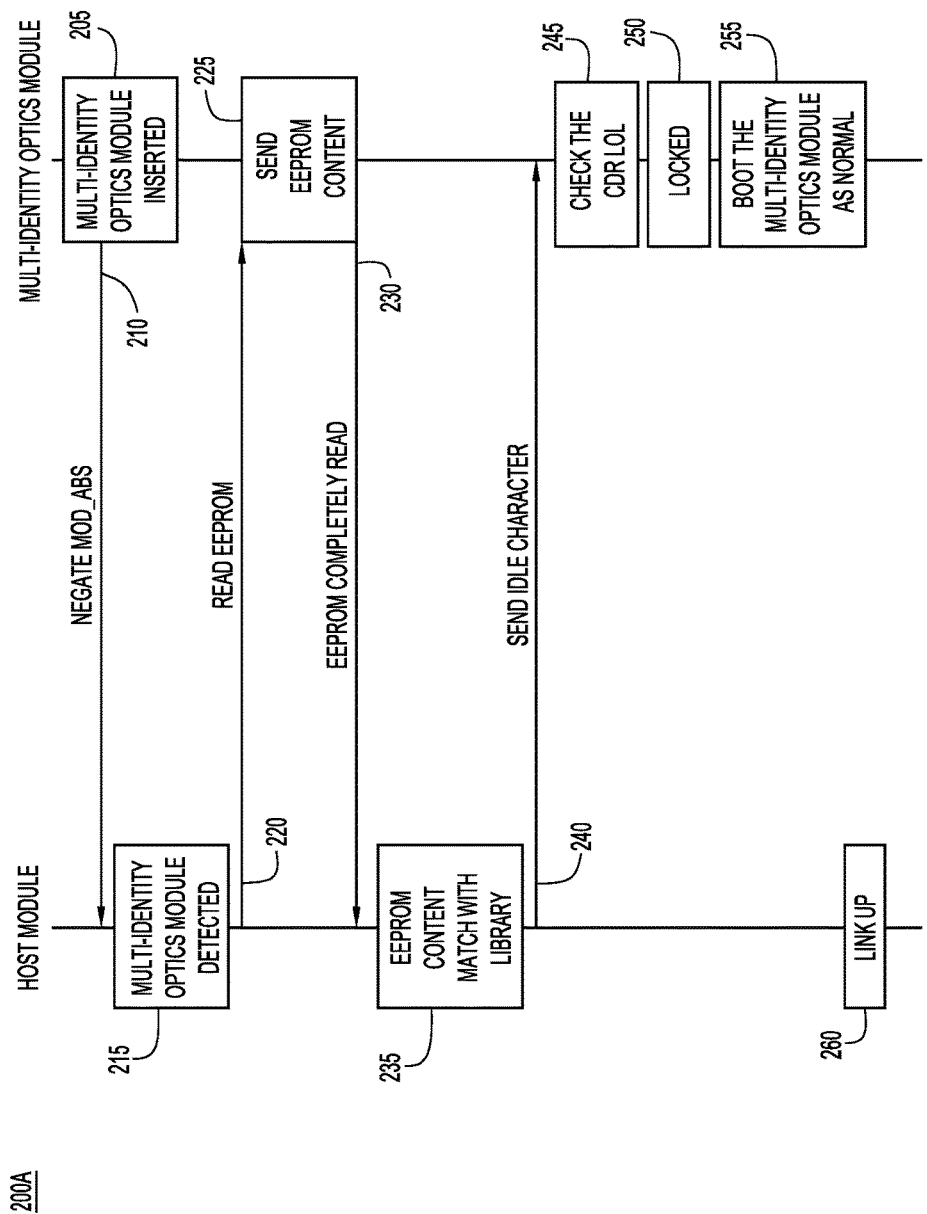
FIGS. 2A and 2B are sequence diagrams illustrating communication between a host module and a multi-identity optics module according to an example embodiment.

In one embodiment, an optics module sends, to a host module, a pin signal indicating that an optics module is plugged into the host module, wherein the optics module is configured to operate at at least a first data rate and a second data rate. The optics module receives, from the host module, an indication of a host data rate. The optics module determines whether there is clock and data recovery loss of lock between the first data rate and a host data rate. If it is determined that there is clock and data recovery loss of lock between the first data rate and the host data rate, the optics module initializes at the second data rate if the second data rate matches the host data rate.

Example Embodiments

Described herein is a multi-identity multi-rate optics (optical) module that is generally compatible with its associated single-rate host module without requiring a software driver change on the single-rate host module. Thus, for example, a multi-identity dual-rate 10/25 G optics module is generally compatible with single-rate 10 G host modules, single-rate 25 G host modules, and dual-rate 10/25 G host modules. In another example, a multi-identity tri-rate 10/25/50 G optics module is generally compatible with single-rate 10 G host modules, single-rate 25 G host modules, dual-rate (e.g., 10/25 G) host modules, tri-rate (e.g., 10/25/50 G) host modules, etc.

With reference first to FIG. 1, shown is a node 100 in communication with an optical network 105 in accordance with examples presented herein. The node is an optical network node that includes host cards 110(1)-110(3), multi-identity optics modules 115(1)-115(3), and fiber optic cables 120(1)-120(3).

Fiber optic cables 120(1)-120(3) transport optical signals that carry data between the node 100 and the network 105 at different rates. For example, fiber optic cables 120(1) and 120(3) transport optical signals at a transmit data at a rate of 10 G, and fiber optic cable 120(2) transports optical signals at a transmit data at a rate of 25 G. Host cards 110(1)-110(3) are respectively configured to handle the data rates of fiber optic cables 120(1)-120(3). Specifically, host card 110(1) is a single-rate (e.g., 10 G) host module, host card 110(2) is a single-rate (e.g., 25 G) host module, and host card 110(3) is a dual-rate (e.g., 10/25 G) host module. Because host card 110(3) is dual-rate, it is compatible with either 10 G or 25 G data rates.

Fiber optic cables 120(1)-120(3) carry data in the form of optical signals, but host cards 110(1)-110(3) are configured to handle electrical signals. As such, multi-identity optics modules 115(1)-115(3) are provided to interface the host cards 110(1)-110(3) and fiber optic cables 120(1)-120(3). For example, multi-identity optics module 115(1) converts incoming optical signals from fiber optic cable 120(1) to electrical signals for host card 110(1). Multi-identity optics module 115(1) also converts incoming electrical signals from host card 110(1) to optical signals for fiber optic cable 120(1). In this example, multi-identity optics modules 115(1)-115(3) are each of the same type (e.g., multi-identity dual-rate 10/25 G optics modules). Therefore, as explained in greater detail below, multi-identity optics modules 115(1)-115(3) are generally compatible with host card 110(1) (e.g., 10 G), host card 110(2) (e.g., 25 G), and host card 110(3) (e.g., 10/25 G).

Figure 2B:
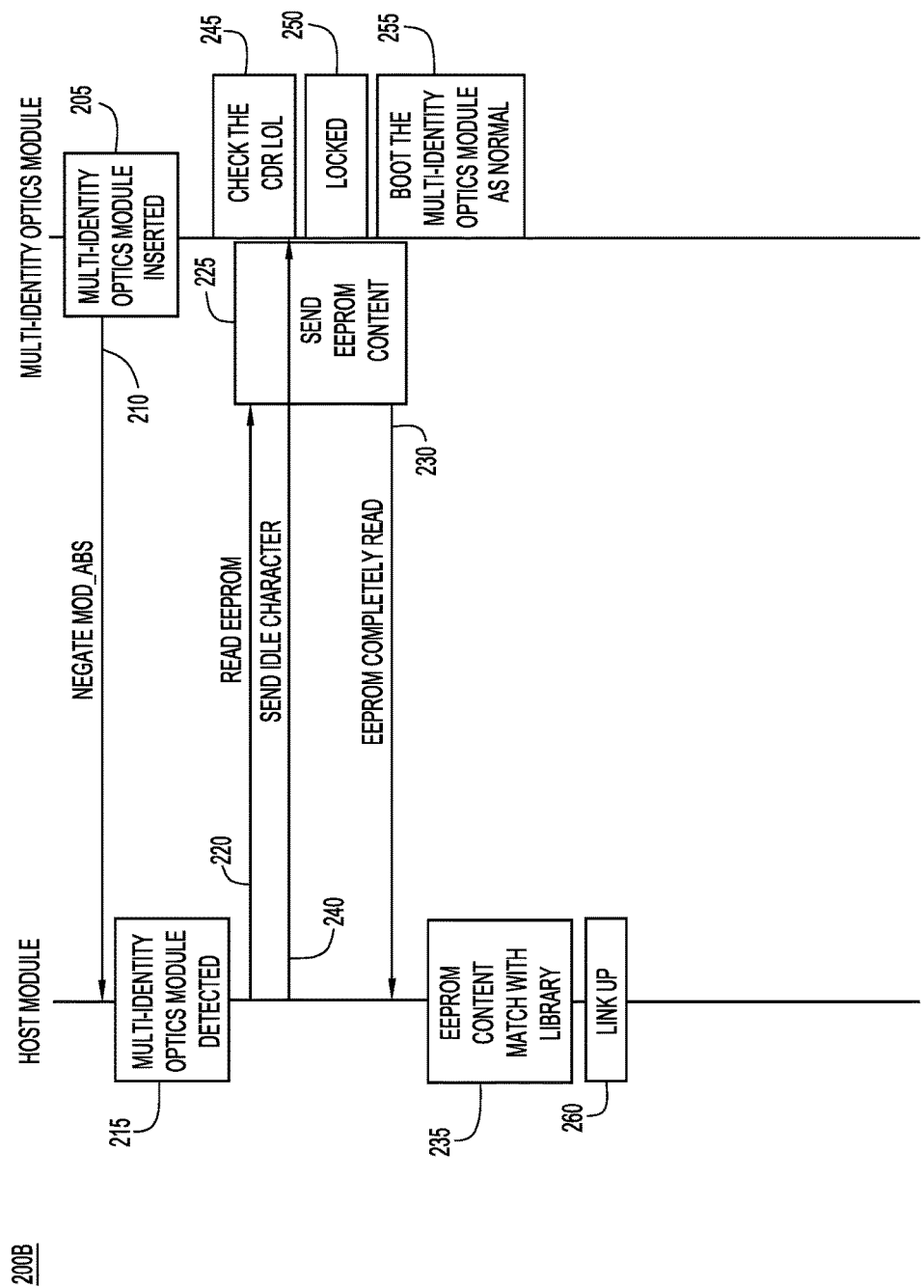

With reference to FIGS. 2A and 2B, shown are sequence diagrams 200A and 200B illustrating communication between a host module and a multi-identity optics module in accordance with examples presented herein. Turning first to FIG. 2A, at 205, a user inserts the multi-identity optics module into the host module. At 210, the multi-identity optics module negates a module absent (MOD_ABS) signal. MOD_ABS indicates the absence of the multi-identity optics module. When the multi-identity optics module negates MOD_ABS, the host module detects the presence of the multi-identity optics module at 215.

At 220, the host module begins reading an electrically erasable programmable read-only memory (EEPROM) map from a memory buffer of the multi-identity optics module that is accessible by the host module. The EEPROM map specifies a data rate at which the multi-identity optics module is currently configured to operate. As discussed below, the multi-identity optics module includes multiple EEPROM maps, each corresponding to a different data rate. At 225, the multi-identity optics module sends the content of the EEPROM map to the host module until the host module has completely read the EEPROM map at 230. At 235, the host module determines that the content of the EEPROM map (e.g., the specified data rate) matches with a library storing an indication of the data rate of the host module.

Having confirmed that the multi-identity optics module data rate matches the host module data rate, the host module sends an idle character to the multi-identity optics module at 240. At 245, the multi-identity optics module determines whether there is clock and data recovery loss of lock between the multi-identity optics module data rate and the host data rate. Clock and data recovery enables the multi-identity optics module to sample the idle character to determine the host module data rate. At 250, the multi-identity optics module determines that there is no clock and data recovery loss of lock between the multi-identity optics module data rate and the host data rate. In other words, the multi-identity optics module and the host data rates lock/match.

In an example, the host module is a single-rate 25 G host card and the EEPROM map specifies that the multi-identity optics module is currently configured to operate at a data rate of 25 G. In this example, the host module determines that the rate specified in the EEPROM map (25 G) matches the host data rate (also 25 G). Similarly, multi-identity optics module determines from the idle character that the host data rate (25 G) matches the rate specified in the EEPROM map (also 25 G). Thus, the host module determines the data rate at which the multi-identity optics module is currently configured to operate based on the EEPROM map. Similarly, the multi-identity optics module determines the host data rate based on the idle character. As such, at 255, the host module links up with the multi-identity module, and at 260 the multi-identity optics module boots as normal.

FIG. 2B is a sequence diagram 200B illustrating communication between a host module and a multi-identity optics module in accordance with examples presented herein. Sequence diagram 200B is similar to sequence diagram 200A. However, whereas the sequence in FIG. 2A involves the host module reading the EEPROM map before sending the idle character to module, the sequence in FIG. 2B involves the host reading the EEPROM map after sending idle character to module.

As shown in FIG. 2B, at 205 the multi-identity optics module is inserted (e.g., by a user). At 210, the multi-identity optics module negates the MOD_ABS signal. At 215, the host module detects the presence of the multi-identity optics module. At 220, the host module begins reading the EEPROM map. At 225, the multi-identity optics module sends the content of the EEPROM map to the host module. In the example sequence of FIG. 2B, the host module sends the idle character at 240 before the host module has completely read the EEPROM map at 230. This enables the multi-identity optics module to determine that there is no clock and data recovery loss of lock between the multi-identity optics module data rate and the host data rate at 245 and 250 while the host is reading the EEPROM map. At 235, the host module determines that the content of the EEPROM map (e.g., the specified data rate) matches a library storing an indication of the data rate of the host module. At 260, the host module links up with the multi-identity module, and at 255 the multi-identity optics module boots as normal.

Figure 3:
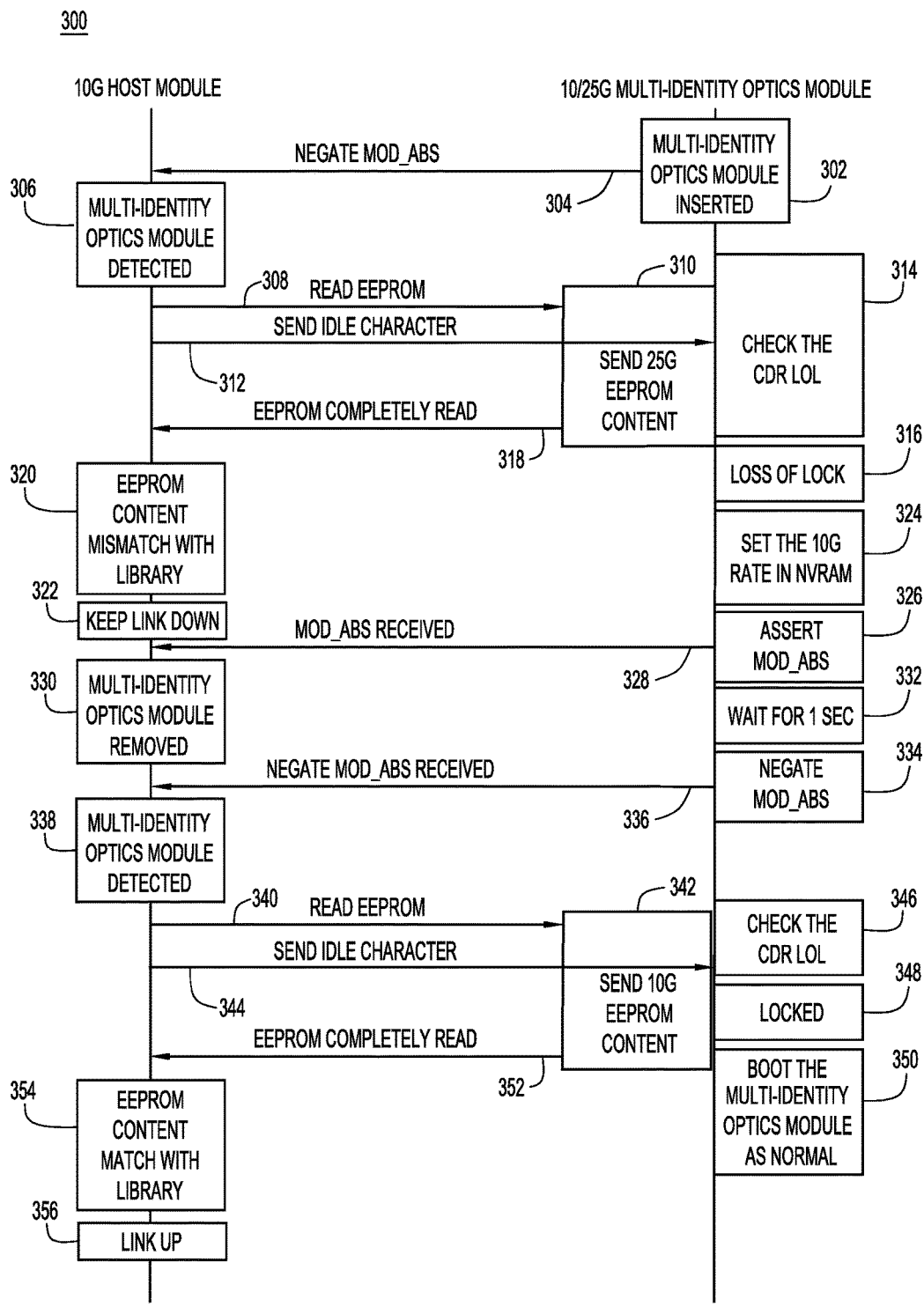
FIG. 3 is a sequence diagram illustrating communication between a host module and a multi-identity optics module according to another example embodiment

FIG. 3 is a sequence diagram illustrating communication between a host module and a multi-identity optics module in accordance with another example embodiment. The sequence of FIG. 3 involves a 10 G host module and a dual-rate 10/25 G multi-identity optics module. Like the sequence of FIG. 2B, in this sequence the host module sends the idle character before the host module has completely read the EEPROM map. Unlike the sequences of FIGS. 2A and 2B, this sequence involves a mismatch between the first EEPROM map that the host module reads and the host module data rate.

At 302, the multi-identity optics module is inserted (e.g., by a user). At 304, the multi-identity optics module negates the MOD_ABS signal. At 306, the host module detects the presence of the multi-identity optics module. At 308, the host module begins reading a first EEPROM map. In this example, the first EEPROM map specifies a multi-identity optics module data rate of 25 G. At 310, the multi-identity optics module sends the content of the first EEPROM map to the host module. At 312, the host module sends the idle character to the multi-identity optics module. At 314, the multi-identity optics module determines whether there is clock and data recovery loss of lock between the current multi-identity optics module data rate (i.e., 25 G) and the host data rate. At 316, the multi-identity optics module determines that there is clock and data recovery loss of lock between the current multi-identity optics module data rate and the host data rate. From the perspective of the multi-identity optics module, this is because the data rate of the host device (as indicated by the idle character) is 10 G, whereas the current multi-identity optics module data rate (as specified by the first EEPROM map) is 25 G. Meanwhile, at 318 and 320, the host module finishes reading the EEPROM map and determines that the content of the EEPROM map (e.g., the specified data rate) does not match a library storing an indication of the data rate of the host module. From the perspective of the host module, this is because the data rate of the host module (as indicated in the library) is 10 G, whereas the current multi-identity optics module data rate is 25 G (as specified by the first EEPROM map). Accordingly, the host module keeps the link down at 322.

After the multi-identity optics module determines at 316 that there was clock and data recovery loss of lock between the 25 G multi-identity optics module data rate and the 10 G host data rate, the multi-identity optics module sets the rate in a non-volatile random access memory (NVRAM) to 10 G at 324. At 326, the multi-identity optics module asserts a MOD_ABS signal to the host module to indicate the absence of the multi-identity optics module. The host receives the MOD_ABS signal at 328 and, in response, removes the multi-identity optics module at 330. After asserting the MOD_ABS signal at 326, the multi-identity optics module asserts a MOD_ABS signal and, at 332, waits for approximately one second. At 334, the multi-identity optics module negates a MOD_ABS signal. At 336, the host module receives the signal negating MOD_ABS, causing the host module to detect the presence of the multi-identity optics module at 338.

At 340, the host module begins reading the second EEPROM map, which specifies a multi-identity optics module data rate of 10 G. At 342, the multi-identity optics module sends the content of the second EEPROM map to the host module. At 344, the host module sends the idle character to the multi-identity optics module. At 346, the multi-identity optics module determines whether there is clock and data recovery loss of lock between the current multi-identity optics module data rate (i.e., 10 G) and the host data rate. At 348, the multi-identity optics module determines that there is no clock and data recovery loss of lock between the current multi-identity optics module data rate and the host data rate. From the perspective of the multi-identity optics module, this is because the data rate of the host device (as indicated by the idle character) and the current multi-identity optics module data rate (as specified by the first EEPROM map) are both 10 G. As such, the multi-identity optics module boots as normal at 350.

Meanwhile, at 352 and 354, the host module finishes reading the EEPROM map and determines that the content of the EEPROM map (e.g., the specified data rate) matches the library storing the indication of the data rate of the host module. From the perspective of the host module, this is because the data rate of the host module (as indicated in the library) and the current multi-identity optics module data rate (as specified by the first EEPROM map) are both 10 G. Accordingly, at 356, the host module links up with the multi-identity optics module.

Figure 4:
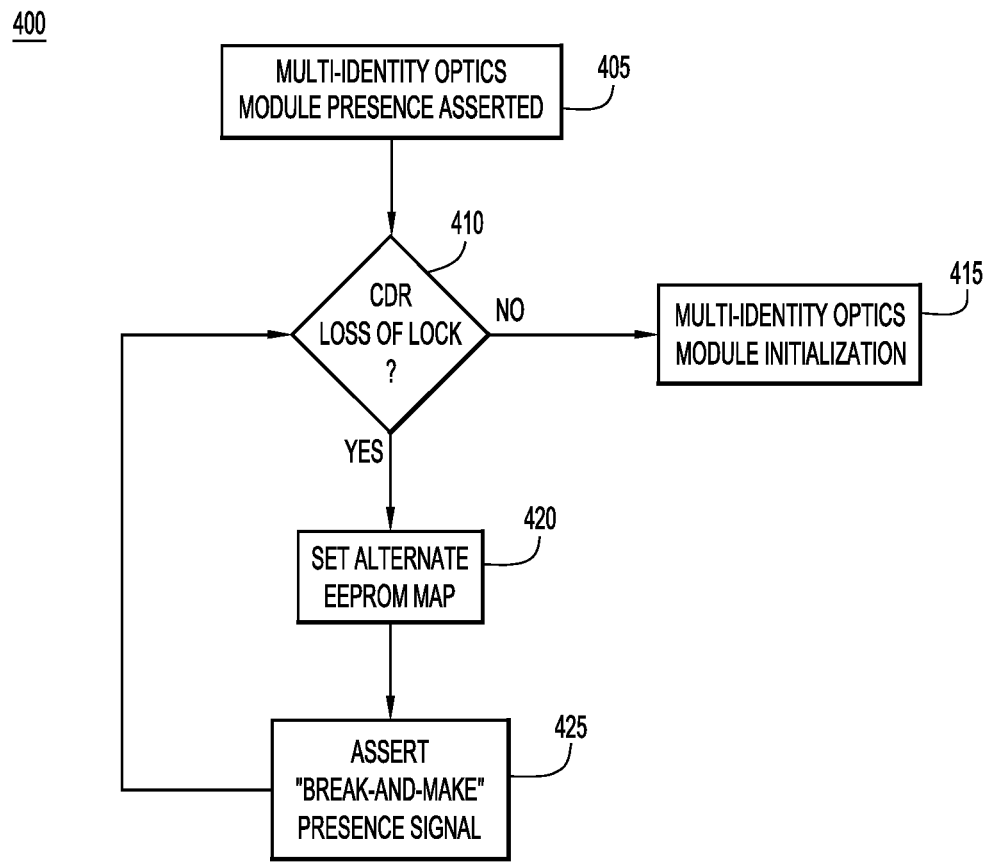
FIG. 4 is a high-level flowchart of a process for initializing a multi-identity optics module at a host module according to an example embodiment.

FIG. 4 is a high-level flowchart 400 of a method for initializing a multi-identity optics module at a host module. At 405, the presence of the multi-identity optics module is asserted. At 410, it is determined whether there is clock and data recovery loss of lock between the current multi-identity optics module data rate and the host data rate. If it is determined that there is no clock and data recovery loss of lock ("No"), the current multi-identity optics module data rate and the host data rate match and the multi-identity optics module is initialized at 415. If it is determined that there is clock and data recovery loss of lock ("Yes"), the current multi-identity optics module data rate and the host data rate do not match. Thus, the flow proceeds to 420, where the multi-identity optics module data rate sets an alternate EEPROM map that specifies an alternate multi-identity optics module data rate. At 425, the multi-identity optics module asserts a "break-and-make" presence signal. A purpose of the "break-and-make" presence signal is to provoke the host module to read the alternate EEPROM map. The "break-and-make" presence signal may involve asserting a MOD_ABS signal and then negating the MOD_ABS signal after some time.

Figure 5:
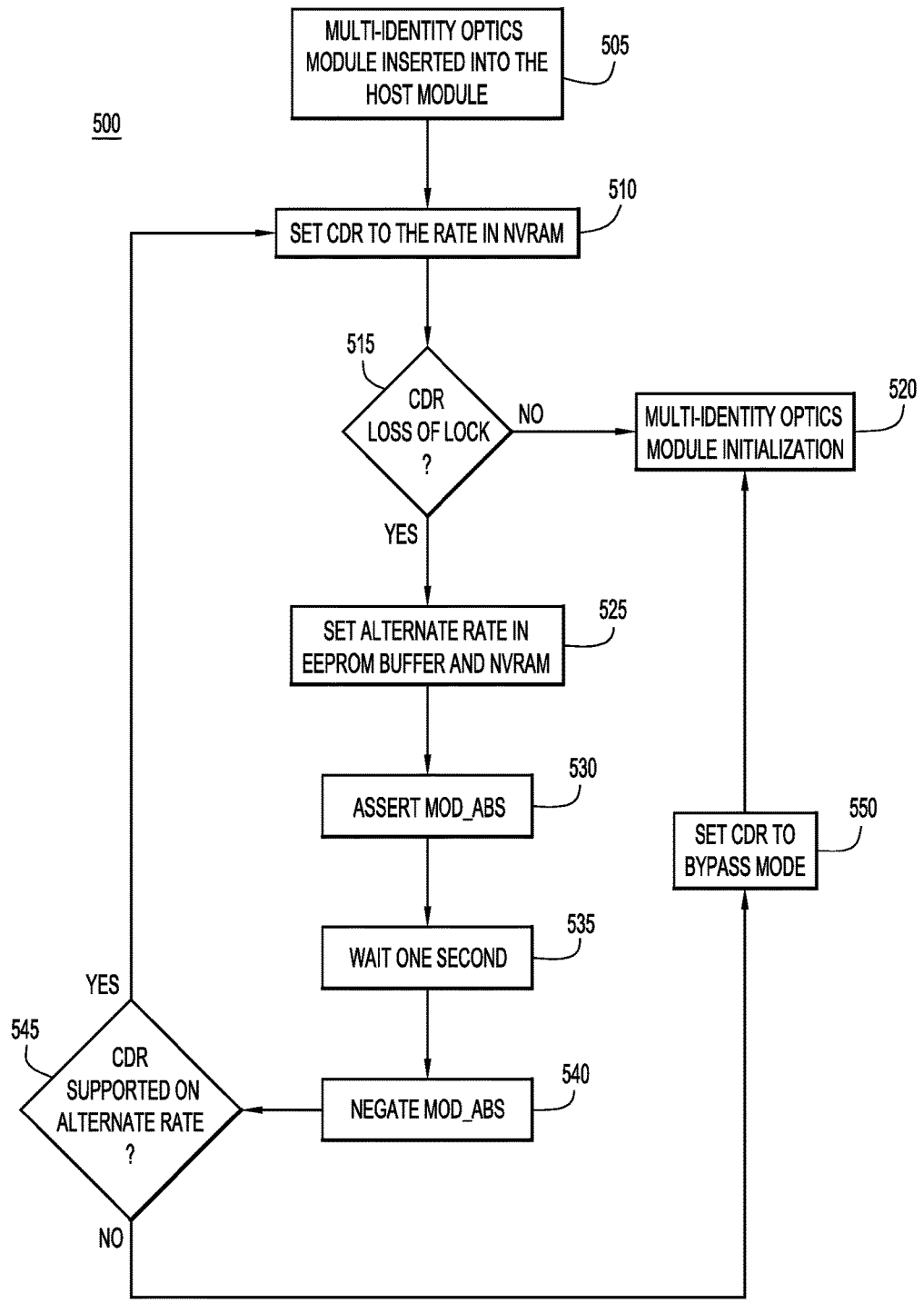
FIG. 5 is a flowchart for a process for initializing a dual rate (e.g., 10/25 G) multi-identity optics module at a host module according to an example embodiment.

FIG. 5 is a flowchart 500 of an example method for initializing a dual-rate (e.g., 10/25 G) multi-identity optics module on a 10 G host module. The 10/25 G multi-identity optics module includes a NVRAM and two EEPROM maps respectively specifying multi-identity optics module data rates (i.e., 10 G and 25 G). At 505, the multi-identity optics module is inserted into the host module. At 510, the multi-identity optics module sets the clock and data recovery rate to the rate currently stored in the NVRAM. In this example, 25 G is the default rate (i.e., the data rate initially stored in the NVRAM). The multi-identity optics module 25 G data rate is also stored in an EEPROM buffer to allow the host module to read the 25 G EEPROM content.

At 515, the multi-identity optics module determines whether there is clock and data recovery loss of lock between the current multi-identity optics module data rate (i.e., 25 G) and the host data rate (i.e., 10 G). If there is no clock and data recovery loss of lock ("No"), the multi-identity optics module initializes at 520. However, in this example there is clock and data recovery loss of lock ("Yes") because the current multi-identity optics module data rate (i.e., 25 G) is different from the host data rate (i.e., 10 G). As such, the flow proceeds to 525, at which the multi-identity optics module sets the alternate rate (i.e., 10 G) in the EEPROM buffer and NVRAM.

At 530-540, the multi-identity optics module asserts a "break-and-make" presence signal. At 530, the multi-identity optics module asserts a MOD_ABS signal to indicate the absence of the multi-identity optics module to the host module. At 535, the multi-identity optics module waits for a period of time (e.g., one second). At 540, the multi-identity optics module negates the MOD_ABS signal. This causes the host module to recognize the multi-identity optics module. Thus, the "break-and-make" presence signal enables the multi-identity optics module to remain plugged in to the host module while setting the alternate data rate. From the perspective of the host module, a 25 G optics module was inserted (505), the 25 G optics module was physically removed (530), and a 10 G optics module was inserted (540). However, in reality, the multi-identity module remained inserted in the host module and while providing both 10 G and 25 G data rates.

Although the multi-identity optics module supports clock and data recovery at 25G, the multi-identity optics module may or may not support clock and data recovery at 10G. As such, at 545, the multi-identity optics module determines whether the multi-identity optics module supports clock and data recovery at the 10G data rate. If the multi-identity optics module does not support clock and data recovery at the 10G data rate ("No"), at 550 the multi-identity optics module sets the clock and data recovery to bypass mode. This enables the multi-identity optics module to initialize at 520 without determining whether there is clock and data recovery loss of lock. If the multi-identity optics module supports clock and data recovery at the 10G data rate ("Yes"), the multi-identity optics module sets the clock and data recovery rate to the rate in the NVRAM at 510. Per 525, the rate in the NVRAM is 10G. At 515, the multi-identity optics module determines whether there is clock and data recovery loss of lock between the current multi-identity optics module data rate (i.e., 10G) and the host data rate (i.e., 10G). Because these rates match, there is no clock and data recovery loss of lock ("No"), and the multi-identity optics module initializes at 520.

Figure 6:
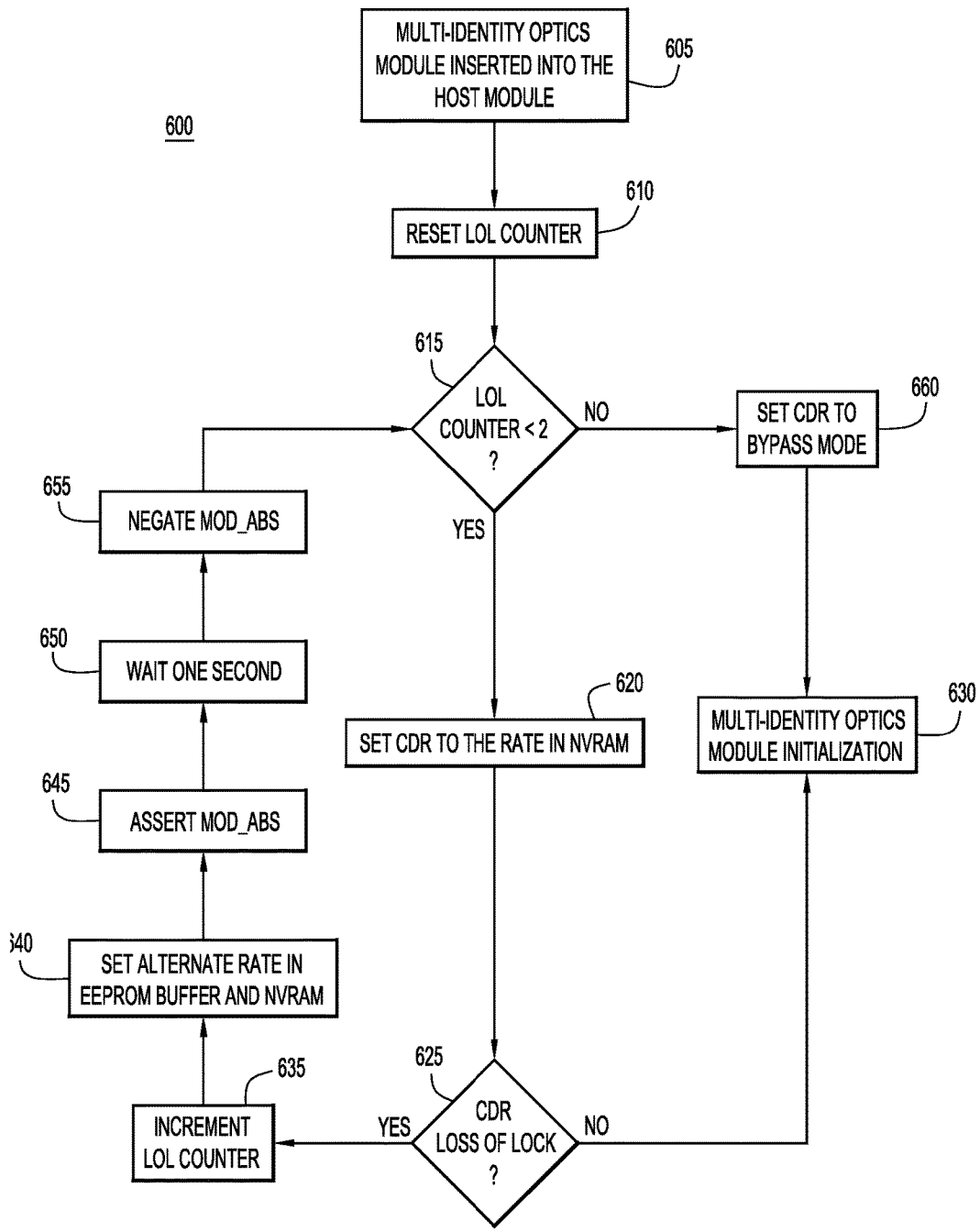
FIG. 6 is a flowchart for a process for initializing a tri-rate (e.g., 10/25/50 G) multi-identity optics module at a host module according to an example embodiment.

FIG. 6 is a flowchart 600 of an example method for initializing a tri-rate (e.g., 10/25/50 G) multi-identity optics module on a 10 G host module. The 10/25/50 G multi-identity optics module includes a NVRAM and three EEPROM maps respectively specifying multi-identity optics module data rates (i.e., 10 G, 25 G, and 50 G). In this example, the multi-identity optics module does not support clock and data recovery at 10 G.

At 605, the multi-identity optics module is inserted into the host module. At 610, the clock and data recovery loss of lock counter is reset (i.e., set to zero). At 615, the multi-identity optics module determines whether the clock and data recovery loss of lock counter is less than two. In this case, the multi-identity optics module determines that the clock and data recovery loss of lock counter is less than two ("Yes") because the clock and data recovery loss of lock counter is currently set to zero.

At 620, the multi-identity optics module sets the clock and data recovery rate to the rate currently stored in the NVRAM. In this example, 25 G is the default rate (i.e., the data rate initially stored in the NVRAM). The multi-identity optics module 25 G data rate is also stored in an EEPROM buffer to allow the host module to read the 25 G EEPROM content. At 625, the multi-identity optics module determines whether there is clock and data recovery loss of lock between the current multi-identity optics module data rate (i.e., 25 G) and the host data rate (i.e., 10 G). If there is no clock and data recovery loss of lock ("No"), the multi-identity optics module initializes at 630. However, in this example there is clock and data recovery loss of lock ("Yes") because the current multi-identity optics module data rate (i.e., 25 G) is different from the host data rate (i.e., 10 G). As such, the flow proceeds to 635, where the multi-identity optics module increments the clock and data recovery loss of lock counter such that the counter is now set to one.

At 640, the multi-identity optics module sets an alternate rate (here, 50 G) in the EEPROM buffer and NVRAM. The multi-identity optics module asserts a "break-and-make" presence signal at 645-655 by asserting MOD_ABS (645), waiting for approximately one second (650), and negating the MOD_ABS signal (655). At 615, the multi-identity optics module determines that the clock and data recovery loss of lock counter is less than two ("Yes") because the counter is currently set to one. At 620, the multi-identity optics module sets the clock and data recovery rate to the rate currently stored in the NVRAM (i.e., 50 G). At 625, the multi-identity optics module determines that there is clock and data recovery loss of lock between the current multi-identity optics module data rate (i.e., 50 G) and the host data rate (i.e., 10 G) ("Yes"). As such, the flow proceeds to 635, at which the multi-identity optics module increments the clock and data recovery loss of lock counter such that the counter is now set to two.

This time, at 640, the multi-identity optics module sets another alternate rate (10 G) in the EEPROM buffer and NVRAM. The multi-identity optics module asserts the "break-and-make" presence signal at 645-655 as described above. At 615, the multi-identity optics module determines that the clock and data recovery loss of lock counter is not less than two ("No") because the counter is currently set to two. At 660, the multi-identity optics module sets the clock and data recovery to bypass mode. This enables the multi-identity optics module to initialize at 630 without determining whether there is clock and data recovery loss of lock, which is not supported for 10 G.

Figure 7B:
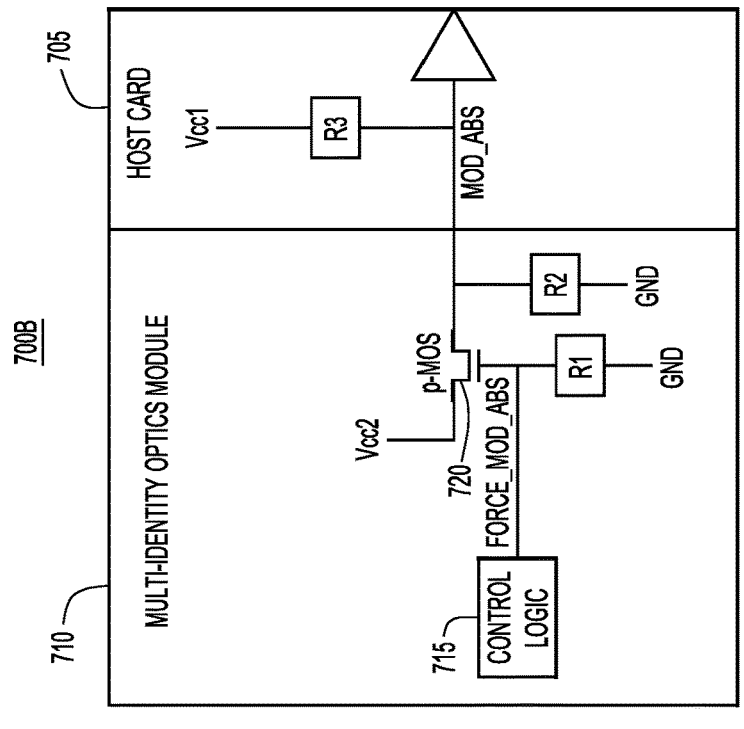
FIGS. 7A-7C are partial circuit diagrams of a multi-identity optics module and a host module and illustrating "break-and-make" techniques according to an example embodiment.
Figure 7A:
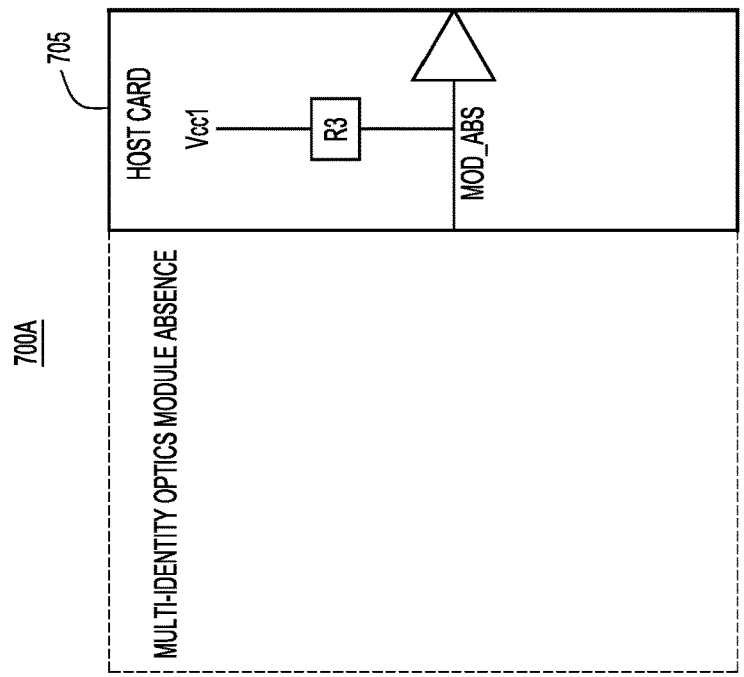
Figure 7C:
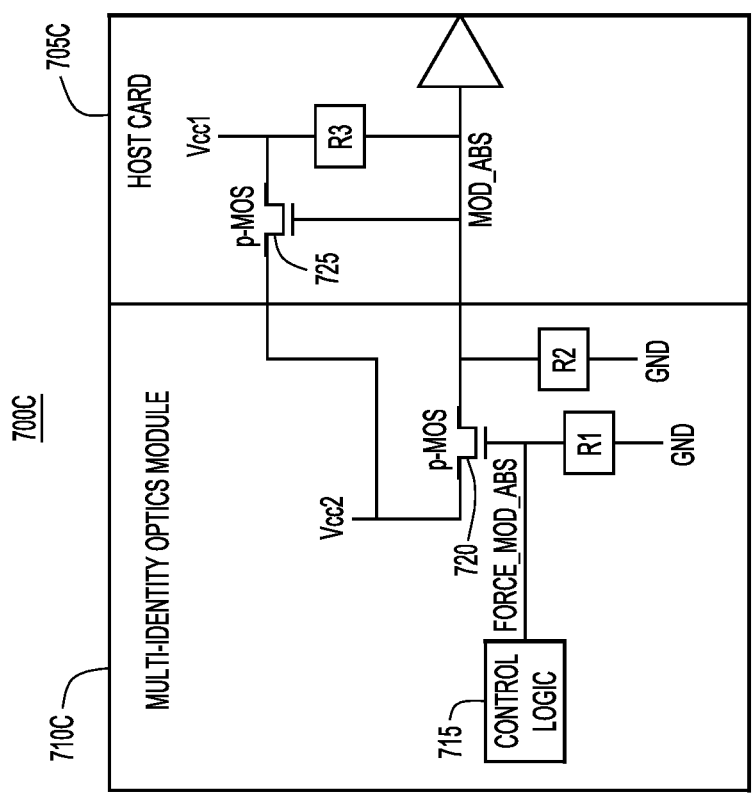

FIGS. 7A-7C illustrate partial circuit diagrams 700A-700C that depict example "break-and-make" mechanisms. With reference to FIG. 7A, a host card 705 is shown with no optics module inserted. $V_{CC1}$ produces a voltage on the MOD_ABS pin that is equal to 3.3V. When the host card detects a voltage on the MOD_ABS pin of 3.3V, the host card recognizes that there is no optics module inserted. As will be discussed below with reference to FIG. 7B, the host card recognizes an inserted optics module when the voltage on the MOD_ABS pin is equal to 0.069V. Thus, MOD_ABS is asserted when the voltage on the MOD_ABS pin equals 3.3V, and MOD_ABS is negated when the voltage on the MOD_ABS pin equals 0.069V. As will be further described with reference to FIG. 7B, the multi-identity optics module may toggle the voltage on the MOD_ABS pin between 3.3V and 0.069V as appropriate to effectuate the "break-and-make" mechanisms without being physically removed from the host card 705.

Turning now to FIG. 7B, a host card 705 is shown with an inserted multi-identity optics module 710. The multi-identity optics module 710 includes control logic 715, a P-type metal oxide (p-MOS) transistor 720 that functions as a switch to control the connection between $V_{CC2}$ and the MOD_ABS pin, and resistors R1 and R2 connected between the transistor 720 and ground. In this example, the p-MOS transistor 720 is closed when the control logic 715 asserts the FORCE_MOD_ABS signal, and is open when the control logic 715 does not asserts the FORCE_MOD_ABS signal.

Initially, when the multi-identity optics module 710 is plugged in to the host card 705, the control logic does not function for a period of time (e.g., one second). During this initial time period, the control logic 715 does not produce the FORCE_MOD_ABS signal. As such, the p-MOS prevents the $V_{CC2}$ signal from reaching the MOD_ABS pin. As such, the 100Ω resistor pulls the voltage on the MOD_ABS pin down to 0.069V (i.e., MOD_ABS is negated). After the initial time period, the control logic 715 begins operating but does not produce the FORCE_MOD_ABS signal. Thus, the voltage on the MOD_ABS pin remains at 0.069V while the multi-identity optics module 710 declares a first data rate to the host card 705.

If the first data rate matches the data rate of the host card, the multi-identity optics module 710 may not initiate a "break-and-make" mechanism. However, if the first data rate does not match the data rate of the host card, the multi-identity optics module 710 may cause the voltage on the MOD_ABS pin to equal 3.3V (i.e., MOD_ABS is asserted). More specifically, the control logic 715 sets the FORCE_MOD_ABS signal to close the p-MOS for a period of time (e.g., one second) such that the voltage from $V_{CC2}$ reaches the MOD_ABS pin. During this period of time, the power consumption on resistor R2 may be 109 mW it is a 100Ω resistor, which a 100Ω resistor may easily handle. While the voltage on the MOD_ABS pin is at 3.3V, the multi-identity optics module 710 sets a second data rate, as described above with respect to FIGS. 3-6.

The control logic 715 may then cease producing the FORCE_MOD_ABS signal, causing the voltage on the MOD_ABS pin to revert to 0.069V (i.e., MOD_ABS is negated). From the perspective of the host card 705, a user removed a mismatched module with the first data rate and inserted at new module with the second data rate. However, in reality, the multi-identity optics module 710 implemented a "break-and-make" mechanism to remain plugged in to the host card 705 while asserting different data rates. When the voltage on the MOD_ABS pin reverts to 0.069V, the host card 705 determines whether the second data rate matches the data rate of the host card 705. If the second data rate matches the data rate of the host card 705, the voltage on the MOD_ABS pin may remain at 0.069V and the host card 705 and multi-identity optics module 710 may transfer data at the second data rate.

In an example, the host card 705 supports a 10 G data rate only, and the multi-identity optics module 710 is a dual-rate 10/25 G module. Initially, the module is inserted and the MOD_ABS signal is negated (i.e., set to 0.069V) to inform the host card 705 that a module is present. The host card 705 proceeds to read, from the multi-identity optics module 710, the EEPROM map specifying the 25 G data rate. Because the current data rate of the multi-identity optics module 710 (i.e., 25 G) does not match that of the host card 705 (i.e., 10

G), the host card 705 does not enable the multi-identity optics module 710. When the multi-identity optics module 710 determines that the current data rate setting does not match the data rate of the host card 705, the multi-identity optics module 710 re-loads the host-readable EEPROM buffer with content specifying a 10 G data rate. The control logic activates the FORCE_MOD_ABS signal, thereby generating the MOD_ABS signal. This causes the host card 705 to determine that the multi-identity optics module 710 has been removed. After approximately one second, the control logic 715 disables the FORCE_MOD_ABS signal, thereby negating the MOD_ABS signal. This causes the host card 705 to determine that the multi-identity optics module 710 has been inserted, and reads the EEPROM map specifying the 10 G data rate. Because the EEPROM content now matches the host card data rate, the host card 705 may enable the multi-identity optics module 710.

In the above example, the multi-identity optics module 710 implemented the "break-and-make" mechanism in the host card 705, which does not shut down power in the absence of multi-identity optics module 710. FIG. 7C illustrates an alternative example partial circuit diagram 700C in which the host card 705C shuts down power to the multi-identity optics module 710C when multi-identity optics module 710C is not present or MOD_ABS is deasserted. The circuitry shown in FIG. 7C is similar to that shown in FIG. 7B, except that power $V_{CC2}$ of host card 705C supplies power to power supply $V_{CC1}$ of multi-identity optics module 710C power via a p-MOS transistor 725. In an example, the host card 705C supports 10 G data rates only, and the multi-identity optics module 710C is a dual-rate 10/25 G module.

Initially, a user inserts a multi-identity optics module 710C into the host card 705C. As described above, the MOD_ABS signal is negated and the control logic 715 is initially inactivated. Even upon activating after a period of time, the control logic does not initiate the FORCE_MOD_ABS signal. The host card 705C reads the EEPROM content from the multi-identity optics module 710C. In this example, the EEPROM content specifies a 25 G data rate. Because the 25 G data rate does not match the 10 G data rate of the host card 705C, the host card 705C does not enable the multi-identity optics module 710C. When the multi-identity optics module 710C detects the data rate mismatch, the multi-identity optics module 710C re-loads the host-readable EEPROM buffer with content specifying a 10 G data rate, and enables the FORCE_MOD_ABS signal (i.e., by setting the voltage on the MOD_ABS pin to 3.3V). This breaks or deasserts the MOD_ABS signal, prompting the host card 705C to shut down power (i.e., $V_{CC1}$). The MOD_ABS pin remains set to 3.3V momentarily due to the intrinsic capacitance of the multi-identity optics module 710C. As mentioned, this momentary 3.3V pulse allows the host card 705C to detect the removal of the multi-identity optics module 710C. With no power supplied to multi-identity optics module 710C, the voltage across the MOD_ABS pin is now 0V, causing the host card 705C to detect the presence of multi-identity optics module 710C and apply power to the multi-identity optics module 710C via transistor 725. Subsequently, the host card 705C recognizes the multi-identity optics module 710C and reads the current EEPROM map. The EEPROM map now stores the matching data rate (i.e., 10 G), and the host card 705C enables the transfer of data to/from the multi-identity optics module 710C.

Figure 8:
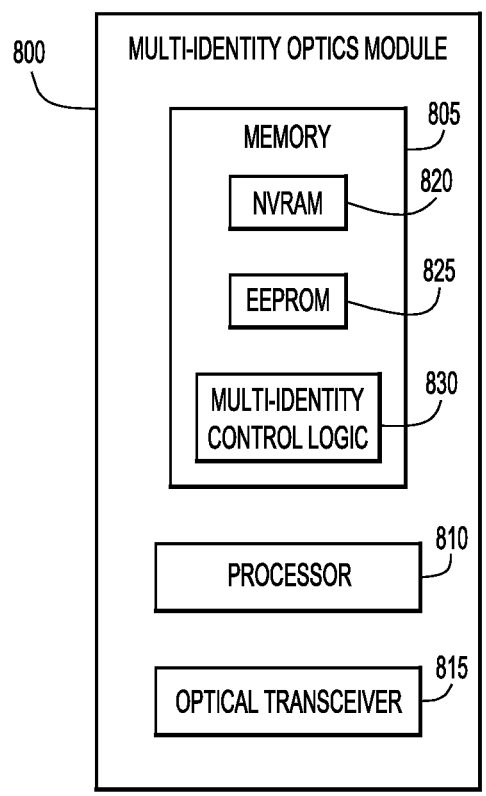
FIG. 8 is a block diagram of a computing device configured to execute multi-identity techniques according to an example embodiment.

FIG. 8 is a block diagram of a multi-identity optics module 800 that is configured to implement the techniques presented herein. In this example, the multi-identity optics module 800 includes a memory 805, one or more processors 810, and optical transceiver 815. The memory 805 includes NVRAM 820, EEPROM 825, and multi-identity control logic 830. The one or more processors 810 are configured to execute instructions stored in the memory 805 (e.g., multi-identity control logic 830). When executed by the one or more processors 810, the multi-identity control logic 830 enables the multi-identity optics module 800 to perform the multi-identity operations described herein in connection with FIGS. 1-7C. The memory 805 may be read only memory (ROM), random access memory (RAM), magnetic disk storage media devices, optical storage media devices, flash memory devices, electrical, optical, or other physical/tangible memory storage devices. Thus, in general, the memory 805 may comprise one or more tangible (non-transitory) computer readable storage media (e.g., a memory device) encoded with software comprising computer executable instructions and when the software is executed (by the processor 810) it is operable to perform the operations described herein.

Figure 9:
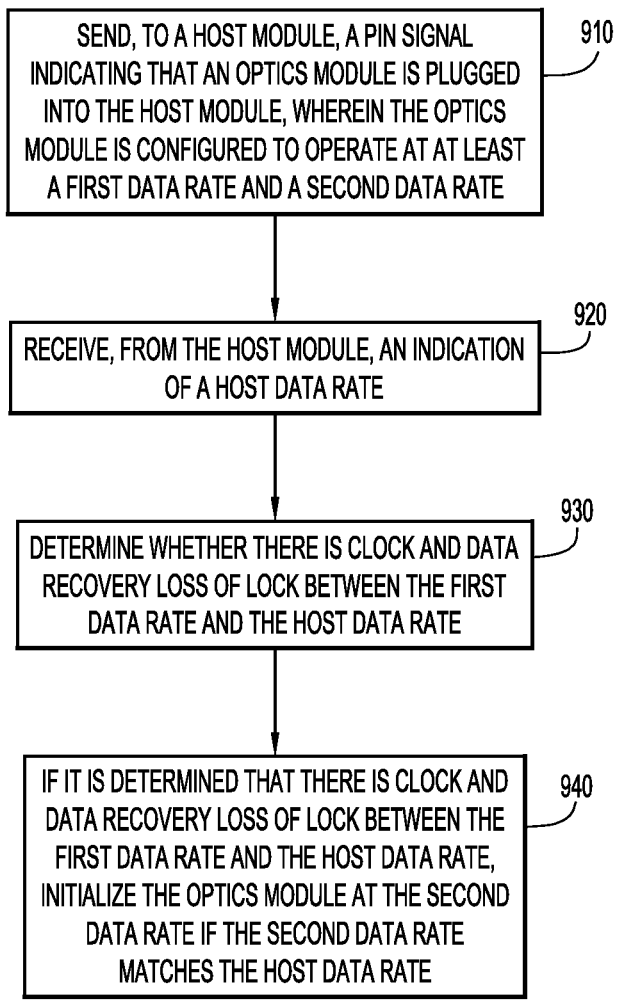
FIG. 9 is a flowchart of a generalized method according to an example embodiment.

FIG. 9 is a generalized flowchart 900 of a method in accordance with examples presented herein. At 910, an optics module sends, to a host module, a pin signal indicating that an optics module is plugged into the host module, wherein the optics module is configured to operate at at least a first data rate and a second data rate. At 920, the optics module receives, from the host module, an indication of a host data rate. At 930, the optics module determines whether there is clock and data recovery loss of lock between the first data rate and the host data rate. At 940, if it is determined that there is clock and data recovery loss of lock between the first data rate and the host data rate, the optics module initializes at the second data rate if the second data rate matches the host data rate.

The multi-identity multi-rate optics modules described herein are generally compatible with single-rate platforms (e.g., legacy platforms). As such, these optics modules may directly replace single-rate optics without requiring a change to the platform software driver. In addition, the EEPROM maps stored in the multi-identity multi-rate optics modules may comply with the appropriate multi-source agreement (MSA) in accordance with the proper MSA compliance codes. These optics modules offer product consolidation, and volume and cost reduction. They also minimize product life cycle maintenance, ease inventory management, and lower bill of materials and implementation costs.

In one form, a method is provided. The method comprises: sending, to a host module, a pin signal indicating that an optics module is plugged into the host module, wherein the optics module is configured to operate at at least a first data rate and a second data rate; receiving, from the host module, an indication of a host data rate; determining whether there is clock and data recovery loss of lock between the first data rate and a host data rate; and if it is determined that there is clock and data recovery loss of lock between the first data rate and the host data rate, initializing the optics module at the second data rate if the second data rate matches the host data rate.

In another form, an apparatus is provided. The apparatus comprises: one or more optical transceivers; and one or more processors coupled to a memory, wherein the one or more processors are configured to: send, to a host module, a pin signal indicating that the apparatus is plugged into the host module, wherein the apparatus is configured to operate at at least a first data rate and a second data rate; receive, from the host module, an indication of a host data rate;

determine whether there is clock and data recovery loss of lock between the first data rate and a host data rate; and if it is determined that there is clock and data recovery loss of lock between the first data rate and the host data rate, initialize the apparatus at the second data rate if the second data rate matches the host data rate.

In another form, a system is provided. The system comprises: a host module; and an optics module configured to plug into the host module, the optics module configured to: send, to a host module, a pin signal indicating that the optics module is plugged into the host module, wherein the optics module is configured to operate at at least a first data rate and a second data rate; receive, from the host module, an indication of a host data rate; determine whether there is clock and data recovery loss of lock between the first data rate and a host data rate; and if it is determined that there is clock and data recovery loss of lock between the first data rate and the host data rate, initialize the optics module at the second data rate if the second data rate matches the host data rate.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   sending, to a host module, a pin signal indicating that an optics module is plugged into the host module, wherein the optics module is configured to operate at at least a first data rate and a second data rate;
   receiving, from the host module, an indication of a host data rate;
   determining whether there is clock and data recovery loss of lock between the first data rate and the host data rate; and
   if it is determined that there is clock and data recovery loss of lock between the first data rate and the host data rate, initializing the optics module at the second data rate if the second data rate matches the host data rate.

2. The method of claim 1, further comprising:
   determining whether the first data rate has been stored in a non-volatile memory; and
   if it is determined that the first data rate has been stored in the non-volatile memory, setting the optics module to operate at the first data rate.

3. The method of claim 1, further comprising:
   storing a first electrically erasable programmable read-only memory map in a host-accessible memory buffer, wherein the first electrically erasable programmable read-only memory map specifies the first data rate.

4. The method of claim 1, wherein initializing the optics module at the second data rate if the second data rate matches the host data rate includes:
   determining whether there is clock and data recovery loss of lock between the second data rate and the host data rate; and
   if it is determined that there is no clock and data recovery loss of lock between the second data rate and the host data rate, initializing the optics module at the second data rate.

5. The method of claim 1, wherein initializing the optics module at the second data rate if the second data rate matches the host data rate includes:
   setting clock and data recovery to a bypass mode.

6. The method of claim 1, further comprising:
   if there is clock and data recovery loss of lock between the first data rate and the host data rate:
      sending, to the host module, a pin signal indicating that the optics module is not plugged into the host module; and
      sending, to the host module, another pin signal indicating that the optics module is plugged into the host module.

7. The method of claim 4, wherein the optics module is configured to operate at a third data rate, the method further comprising:
   if it is determined that there is clock and data recovery loss of lock between the second data rate and the host data rate, initializing the optics module at the third data rate if the third data rate matches the host data rate.

8. An apparatus comprising:
   one or more optical transceivers; and
   one or more processors coupled to the one or more optical transceivers, wherein the one or more processors are configured to:
      send, to a host module, a pin signal indicating that the apparatus is plugged into the host module, wherein the apparatus is configured to operate at at least a first data rate and a second data rate;
      receive, from the host module, an indication of a host data rate;
      determine whether there is clock and data recovery loss of lock between the first data rate and the host data rate; and
      if it is determined that there is clock and data recovery loss of lock between the first data rate and the host data rate, initialize the apparatus at the second data rate if the second data rate matches the host data rate.

9. The apparatus of claim 8, wherein the one or more processors are further configured to:
   determine whether the first data rate has been stored in a non-volatile memory; and
   if it is determined that the first data rate has been stored in the non-volatile memory, set the apparatus to operate at the first data rate.

10. The apparatus of claim 8, wherein the one or more processors are further configured to:
    store a first electrically erasable programmable read-only memory map in a host-accessible memory buffer, wherein the first electrically erasable programmable read-only memory map specifies the first data rate.

11. The apparatus of claim 8, wherein the one or more processors are configured to initialize the apparatus at the second data rate if the second data rate matches the host data rate by:
    determining whether there is clock and data recovery loss of lock between the second data rate and the host data rate; and
    if it is determined that there is no clock and data recovery loss of lock between the second data rate and the host data rate, initializing the apparatus at the second data rate.

12. The apparatus of claim 8, wherein the one or more processors are configured to initialize the apparatus at the second data rate if the second data rate matches the host data rate by:
    setting clock and data recovery to a bypass mode.

13. The apparatus of claim 8, wherein the one or more processors are further configured to:
    if there is clock and data recovery loss of lock between the first data rate and the host data rate:

send, to the host module, a pin signal indicating that the apparatus is not plugged into the host module; and send, to the host module, another pin signal indicating that the apparatus is plugged into the host module.

14. The apparatus of claim 11, wherein the apparatus is configured to operate at a third data rate, the one or more processors further configured to:

if it is determined that there is clock and data recovery loss of lock between the second data rate and the host data rate, initialize the apparatus at the third data rate if the third data rate matches the host data rate.

15. One or more non-transitory computer readable storage media encoded with instructions that, when executed by a processor of an optics module, cause the processor to:

send, to a host module, a pin signal indicating that the optics module is plugged into the host module, wherein the optics module is configured to operate at at least a first data rate and a second data rate;

receive, from the host module, an indication of a host data rate;

determine whether there is clock and data recovery loss of lock between the first data rate and the host data rate; and if it is determined that there is clock and data recovery loss of lock between the first data rate and the host data rate, initialize the optics module at the second data rate if the second data rate matches the host data rate.

16. The one or more non-transitory computer readable storage media of claim 15, wherein the instructions further cause the processor to:

determine whether the first data rate has been stored in a non-volatile memory; and if it is determined that the first data rate has been stored in the non-volatile memory, set the optics module to operate at the first data rate.

17. The one or more non-transitory computer readable storage media of claim 15, wherein the instructions further cause the processor to:

store a first electrically erasable programmable read-only memory map in a host-accessible memory buffer, wherein the first electrically erasable programmable read-only memory map specifies the first data rate.

18. The one or more non-transitory computer readable storage media of claim 15, wherein the optics module is configured to operate at a third data rate, and wherein if the second data rate matches the host data rate, the instructions further cause the processor to:

determine whether there is clock and data recovery loss of lock between the second data rate and the host data rate;

if it is determined that there is no clock and data recovery loss of lock between the second data rate and the host data rate, initialize the optics module at the second data rate; and if it is determined that there is clock and data recovery loss of lock between the second data rate and the host data rate, initialize the optics module at the third data rate if the third data rate matches the host data rate.

19. The one or more non-transitory computer readable storage media of claim 15, wherein if the second data rate matches the host data rate, the instructions further cause the processor to:

set clock and data recovery to a bypass mode.

20. The one or more non-transitory computer readable storage media of claim 15, wherein the instructions further cause the processor to:

if there is clock and data recovery loss of lock between the first data rate and the host data rate:

send, to the host module, a pin signal indicating that the optics module is not plugged into the host module; and send, to the host module, another pin signal indicating that the optics module is plugged into the host module.

* * * * *